United States Patent [19]

Sato et al.

[11] 3,907,234

[45] Sept. 23, 1975

[54] ENDLESS TAPE CARTRIDGE

[75] Inventors: Takateru Sato; Haruo Shiba; Masaoki Sekine, all of Tokyo, Japan

[73] Assignee: TDK Electronics Co., Ltd., Tokyo, Japan

[22] Filed: Oct. 23, 1973

[21] Appl. No.: 408,899

[30] Foreign Application Priority Data

May 14, 1973 Japan .......................... 48-55418[U]

[52] U.S. Cl. ............ 242/55.19 A; 226/190; 226/194

[51] Int. Cl.[2] ........................................ G11B 15/29

[58] Field of Search ............ 242/55.19 A, 197, 198, 242/199, 200, 72.1; 226/194, 190; 360/90, 93; 352/75

[56] References Cited

UNITED STATES PATENTS

| | | | |
|---|---|---|---|
| 2,223,525 | 12/1940 | Miller | 352/75 |
| 3,438,591 | 4/1969 | Becker et al. | 242/55.19 A |
| 3,601,335 | 8/1971 | Dopkins et al. | 242/199 |
| 3,642,229 | 2/1972 | Downey et al. | 242/199 |

*Primary Examiner*—Billy S. Taylor
*Attorney, Agent, or Firm*—Seidel, Gonda & Goldhammer

[57] ABSTRACT

An endless tape cartridge includes an upper casing, a lower casing and a pinch roller. The lower casing has a shaft securely mounted thereon. The pinch roller is rotatably mounted on the shaft and is provided with an upper end face and a lower end face. The end faces are disposed concentrically about the casing shaft. Each end face has an annular recess formed therein. The upper casing is provided with an upper annular projection and the lower casing is provided with a lower annular projection. The upper projection is adapted to extend into the upper annular recess and the lower projection is adapted to extend into the lower annular recess.

4 Claims, 4 Drawing Figures

ENDLESS TAPE CARTRIDGE

BACKGROUND OF THE INVENTION

The present invention relates to an endless tape cartridge and, more particularly, to an improvement in the construction of a pinch roller and the cartridge casing. In conventional endless tape cartridges, the pinch roller is rotatably mounted on a shaft. A sleeve fits around the periphery of the roller. Typically, the shaft and the roller are made of a hard polymeric plastic material. Consequently, the frictional resistance between the peripheral wall of the shaft and the inner wall of the roller is appreciable. With repeated use, substantial wear of the shaft and the roller takes place. In order to reduce the wear of the shaft and the roller along the interface hereinafter referred to as the "area of relative rotation" between the peripheral wall of the shaft and the inner wall of the roller, it is a common practice in the art to use a shaft and a roller consisting of a low friction polymeric plastic material, such as tetrafluoroethylene fluorocarbons. In addition, a lubricating oil is introduced into the area of relative rotation for further reducing the wear of the shaft and the roller.

It is known in the art to reduce the frictional resistance between layers of tape wound about the cartridge reel by applying a lubricant such as molybdenum disulfide to the back surface of the tape. This ensures that the tape will travel smoothly in an endless loop. However, with repeated use the lubricant is gradually peeled off the back surface of the tape in small particles or flakes. These flakes intrude into the area of relative rotation of the pinch roller. The flakes act as abraders, eroding the shaft and the pinch roller surfaces in the area of relative rotation. The erosion of the shaft and roller surfaces results in an increased frictional resistance between the surfaces. Since the drive force supplied by the capstan drive roller is fixed notwithstanding the increased frictional resistance in the area of relative rotation, a considerable portion of the drive force is spent in overcoming the increased frictional resistance. The drive force delivered to the magnetic tape is reduced correspondingly. As a result, the tape speed will vary causing wow or flutter. In the extreme, the capstan may not be able to drive the roller at all and the tape movement will cease.

Accordingly, a principal advantage of the present invention is that is prevents lubricant particles or flakes from intruding into the area of relative rotation of the pinch roller.

Another advantage of the present invention is that it reduces the frictional resistance to rotation between the pinch roller and the shaft.

A further advantage of the present invention is that it prevents distortions in a tape recording which are due to variations in the speed of the tape.

BRIEF SUMMARY OF THE INVENTION

The present invention overcomes the deficiencies in the prior art which are enumerated above. In sharp contrast to the prior art, a pinch roller is provided with an upper end face and a lower end face. The end faces are disposed concentrically about a casing shaft. Each end face is provided with an annular recess which has an interior wall and a bottom. The cartridge includes an upper casing provided with an upper annular projection and a lower casing provided with a lower annular projection. The upper projection is adapted to extend into the upper annular recess of the roller without physically contacting the recess bottom. The lower projection is adapted to extend into the lower annular recess of the roller without physically contacting the recess bottom. Each annular recess contains, in addition to the corresponding casing projection, a low friction smooth material such as polyurethane, in physical contact with the recess bottom. The pinch roller is disposed within a sleeve which may be made of rubber. Foreign particles cannot intrude into the area of relative rotation of the pinch roller due to the barrier presented by the annular projections and recesses.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
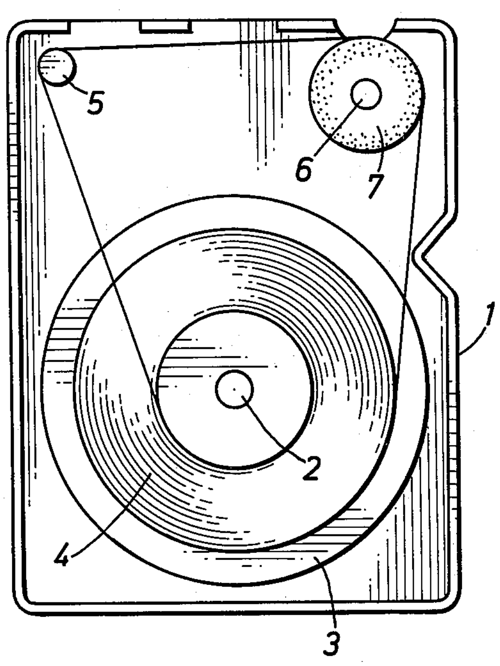
FIG. 1 is a plan view of an endless tape cartridge with the upper casing removed.
Figure 3:
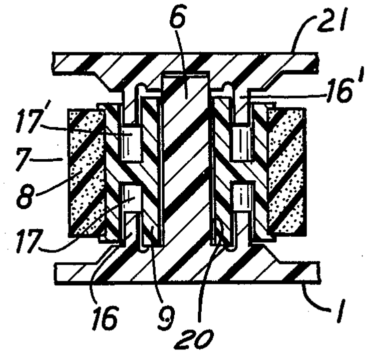
FIG. 3 is a view in cross-section of an embodiment of a pinch roller constructed in accordance with the principles of the present invention.

Referring to the drawings in detail, wherein like numerals indicate like elements, FIG. 1 shows an endless roll of magnetic tape 4 mounted on a reel 3. Reel 3 is rotatably mounted on lower casing 1. The roll of tape 4 is wound about hub 2. Hub 2 is securely mounted on reel 3. As reel 3 rotates, tape 4 is fed to guide roller 5 which guides tape 4 to the periphery of pinch roller 7. Pinch roller 7 is rotatably supported by shaft 6, as shown in FIG. 3. From roller 7, the tape 4 is passed to the outer periphery of endless roll 4.

Figure 2:
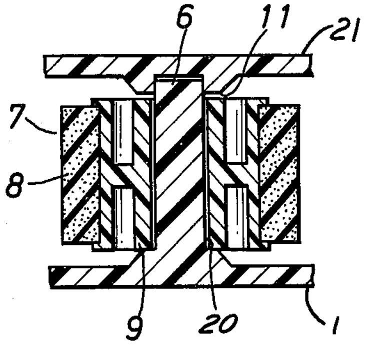
FIG. 2 is a view in cross-section of a conventional pinch roller taken in a vertical plane through the access of rotation of the roller.

As shown in FIG. 2, a conventional pinch roller 7 includes an annular roller 9 and a sleeve 8. The roller 9 consists of a hard substance such as a polymeric plastic material. Sleeve 8 securely engages the outer periphery of roller 9. Typically, sleeve 8 is made of rubber.

Upon insertion into a tape machine (not shown) including a capstan drive roller, the capstan drive roller rollably engages the sleeve 8 causing pinch roller 7 to rotate about shaft 6. Shaft 6 is securely mounted on lower casing 1.

In the conventional pinch roller 7 shown in FIG. 2, a narrow annular gap 20 is formed between the peripheral wall of shaft 6 and the inner wall of roller 9. Shoulders 11 and 13 in upper and lower casings 1 and 2 limit the vertical displacement of roller 9 as it rotates in response to the capstan drive roller.

The lubricant applied to the back surface of the tape 4 is peeled off the tape 4 by frictional and/or vibrational forces arising during the period of operation of the cartridge or during transportation when the cartridge is not in use. These lubricant particles, as well as other foreign particles that have entered the cartridge interior, intrude into the spaces between shoulders 11 and 13 and roller 9 and eventually enter gap 20. This results in erosion of the peripheral wall of shaft 6 and the interior wall of roller 7. This erosion causes variations in the tape speed and, in the extreme, complete blocking of tape movement.

Referring to FIG. 3, there is shown an embodiment of the present invention wherein pinch roller 9 includes a roller 9 and sleeve 8 as previously described. In accordance with the present invention, a lower annular recess 17 and an upper annular recess 17' are provided in roller 9. Annular recesses 17 and 17' are co-axial with shaft 6 and extend into roller 9 from the end faces thereof. A lower annular projection 16 and an upper annular projection 16' are securely mounted on lower casing 1 and upper casing 21, respectively. Lower annular projection 16 extends into lower annular recess 17 and upper annular projection 16' extends into upper annular recess 17', in particular, annular projections 16 and 16' are adapted to extend into annular recesses 17 and 17' without contacting the interior walls of the recesses or the recess bottoms. Thus, the annular walls 16 and 16' do not interfere with the rotation of pinch roller 7.

The configuration of annular recesses 17 and 17' and annular projections 16 and 16' results in a substantially elongated and complicated path over which foreign particles must travel in order to intrude into the area of relative rotation of the pinch roller 7. That is, the foregoing configuration substantially eliminates the intrusion of foreign particles into the area of relative rotation.

Figure 4:
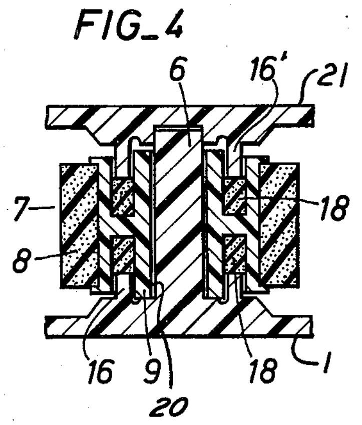
FIG. 4 is a view in cross-section of another embodiment of a pinch roller constructed in accordance with the principles of the present invention.

Referring to FIG. 4 there is illustrated another embodiment of the present invention. In this embodiment, the annular recesses 17 and 17' contain a low friction smooth material 18, such as polyurethane. Material 18 does not interfere with the rotation of pinch roller 7. Preferably, annular projection 16 and 16' are in direct physical contact with material 18. The insertion of material 18 into annular recesses 17 and 17' provides a further obstacle between the area of relative rotation of pinch roller 7 and foreign particles.

In light of the foregoing, it is clear that the present invention substantially eliminates the intrusion of foreign particles into the area of relative rotation of pinch roller 7 with an attendant reduction in wear of shaft 6 and the interior wall of roller 9.

The present invention may be embodied in other specific forms without departing from the spirit or essential attributes thereof and, accordingly, reference should be made to the appended claims, rather than to the foregoing specification as indicating the scope of the invention.

We claim:

1. In an endless tape cartridge including a reel adapted for carrying an endless roll of tape, an upper casing, a lower casing having a shaft securely mounted thereon, and a pinch roller, said pinch roller having a center opening through which said shaft extends for rotatably mounting said pinch roller on said shaft, said pinch roller being adapted for rollable engagement with a capstan, said pinch roller being provided with an upper end face and a lower end face, the improvement for preventing wear of said pinch roller and shaft wherein each end face of said pinch roller is provided with an annular recess disposed concentrically with said shaft, each of said annular recesses being spaced from said center opening and having a bottom; and said upper casing is provided with an upper annular projection and said lower casing is provided with a lower annular projection, said upper annular projection extending into said upper annular recess without physically contacting said upper recess bottom, and said lower annular projection extending into said lower annular recess without physically contacting said lower recess bottom.

2. The improvement in accordance with claim 1 including a smooth low friction material disposed within each of said annular recesses between each of said recess bottoms and each of said upper and lower annular projections.

3. The improvement in accordance with claim 1 wherein said pinch roller is a hard polymeric plastic material.

4. The improvement in accordance with claim 1 wherein said pinch roller is disposed within a rubber sleeve.

* * * * *